(12) United States Patent
Gonzalez et al.

(10) Patent No.: US 8,211,524 B1
(45) Date of Patent: Jul. 3, 2012

(54) CMC ANCHOR FOR ATTACHING A CERAMIC THERMAL BARRIER TO METAL

(75) Inventors: Malberto Gonzalez, Orlando, FL (US); Douglas A. Keller, Kalamazoo, MI (US); Bonnie D. Marini, Oviedo, FL (US); Jay A. Morrison, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1105 days.

(21) Appl. No.: 12/108,708

(22) Filed: Apr. 24, 2008

(51) Int. Cl.
*B32B 3/12* (2006.01)

(52) U.S. Cl. ........ 428/116; 428/118; 428/119; 428/133; 428/137; 428/138; 428/188; 428/457; 428/169; 428/304.4

(58) Field of Classification Search .................. 428/116, 428/118, 119, 133, 137, 138, 188, 457, 469, 428/304.4
See application file for complete search history.

(56) References Cited

U.S. PATENT DOCUMENTS

| | | | |
|---|---|---|---|
| 4,224,019 A | 9/1980 | Dilmore | |
| 4,438,626 A | 3/1984 | Berestecki | |
| 4,512,699 A | 4/1985 | Jackson et al. | |
| 4,639,388 A | 1/1987 | Ainsworth et al. | |
| 4,834,569 A | 5/1989 | Foote et al. | |
| 5,080,934 A | 1/1992 | Naik et al. | |
| 5,320,909 A | 6/1994 | Scharman et al. | |
| 5,605,046 A | 2/1997 | Liang | |
| 6,013,592 A | 1/2000 | Merrill et al. | |
| 6,235,370 B1 | 5/2001 | Merrill et al. | |
| 6,251,526 B1 | 6/2001 | Staub | |
| 6,264,766 B1 | 7/2001 | Ritter et al. | |
| 6,280,584 B1 | 8/2001 | Kumar et al. | |
| 6,284,390 B1 | 9/2001 | Bose et al. | |
| 6,398,837 B1 | 6/2002 | Alvin et al. | |
| 6,499,943 B1 | 12/2002 | Beeck et al. | |
| 6,514,046 B1 | 2/2003 | Morrison et al. | |
| 6,544,003 B1 | 4/2003 | Grylls et al. | |
| 6,617,013 B2 | 9/2003 | Morrison et al. | |
| 6,641,901 B2 | 11/2003 | Merrill et al. | |
| 6,720,087 B2 | 4/2004 | Fried et al. | |
| 6,758,653 B2 | 7/2004 | Morrison | |
| 6,846,574 B2 | 1/2005 | Subramanian | |
| 6,984,277 B2 | 1/2006 | Morrison et al. | |
| 2006/0019087 A1 | 1/2006 | Mazzola et al. | |
| 2006/0286401 A1 | 12/2006 | Kaiser et al. | |

*Primary Examiner* — Ling Xu

(57) ABSTRACT

A ceramic matrix composite (CMC) anchor (20, 100) joining a metal substrate (40) and a ceramic thermal barrier (38). The CMC anchor extends into and interlocks with the ceramic barrier, and extends into and interlocks with the metal substrate. The CMC anchor may be a honeycomb (20) or other extending-into-and-interlocking geometry. A CMC honeycomb may be formed with first (22) and second (24) arrays of cells (26) with open distal ends (28) on respective opposite sides of a sheet (30). The cells may have walls (32) with transverse passages (36). A metal (40) may be deposited into the cells and passages on one side of the sheet, forming a metal substrate locked into the honeycomb. A ceramic insulation material (38) may be deposited into the cells and passages on the opposite side of the sheet, forming a layer of ceramic insulation locked into the honeycomb.

19 Claims, 6 Drawing Sheets

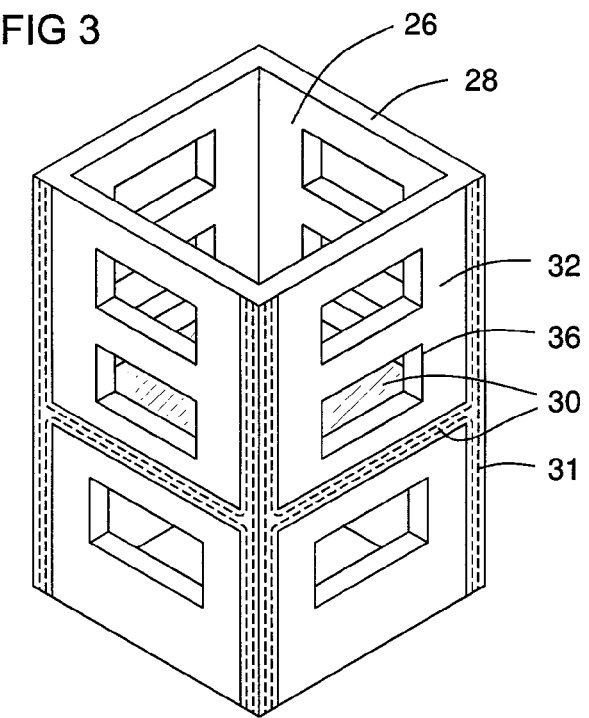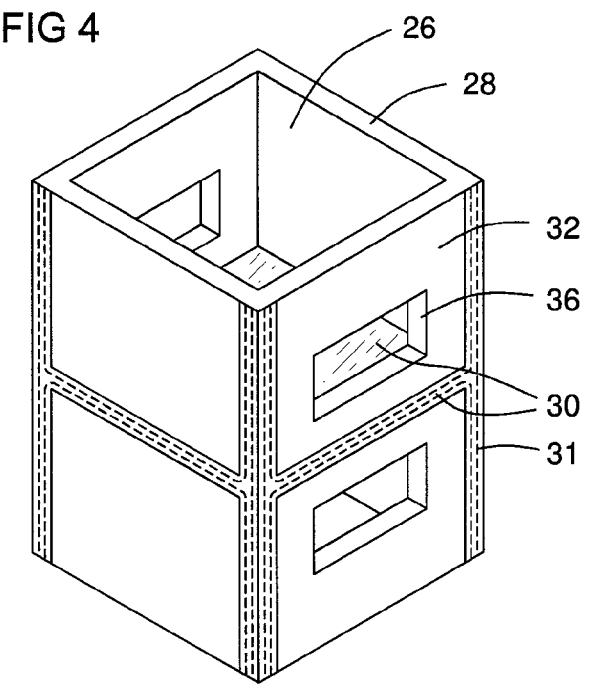

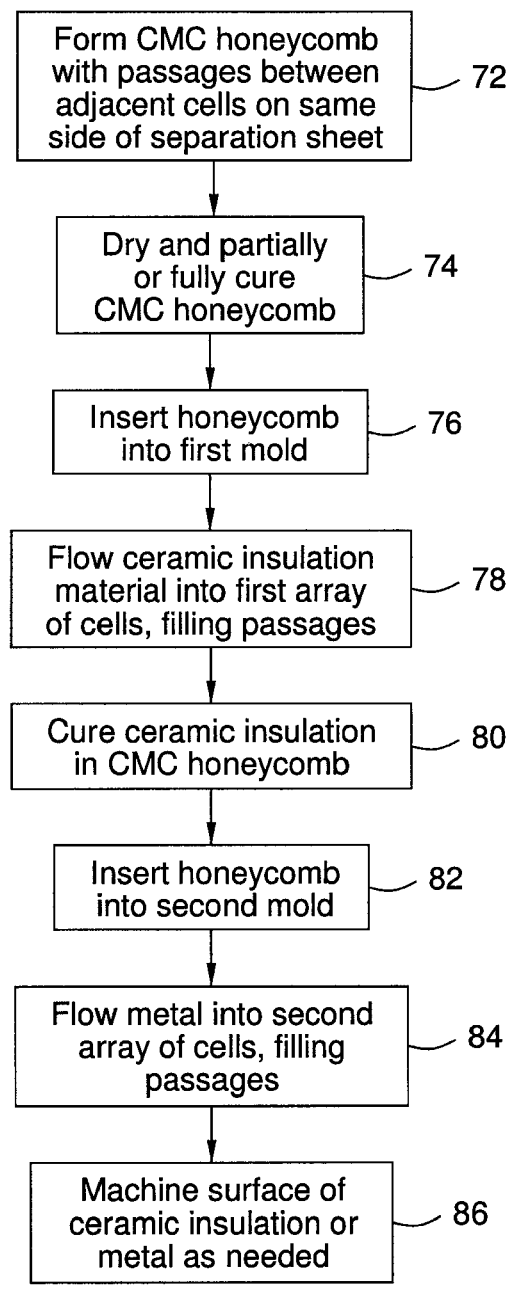

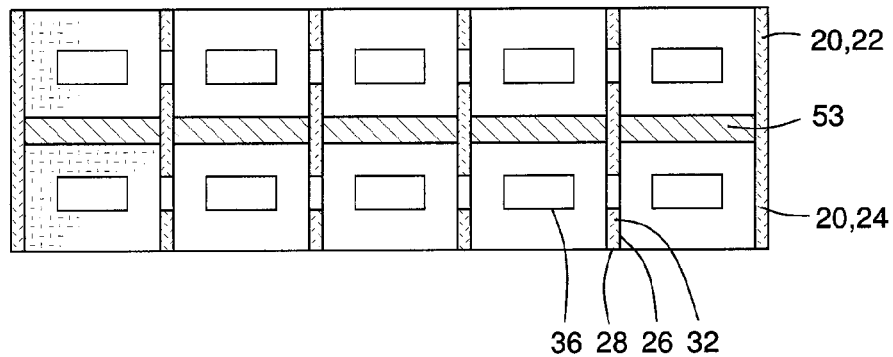
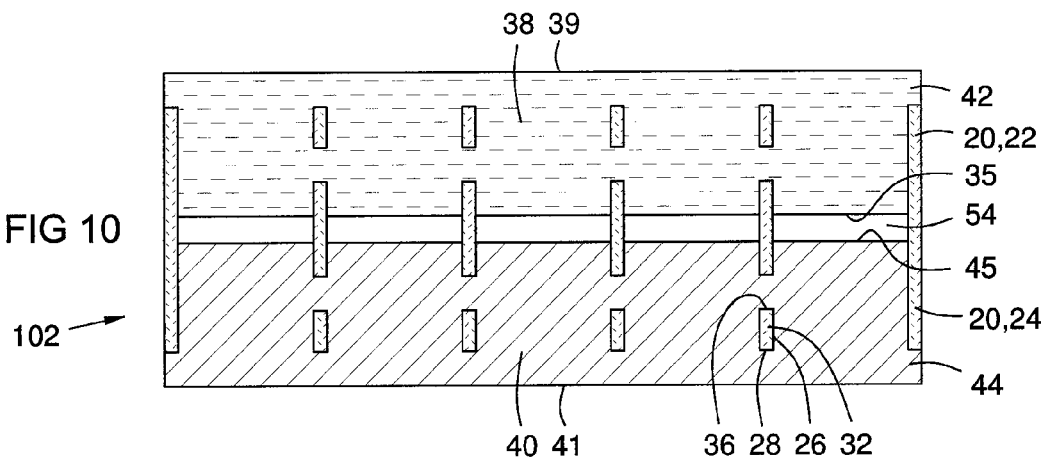
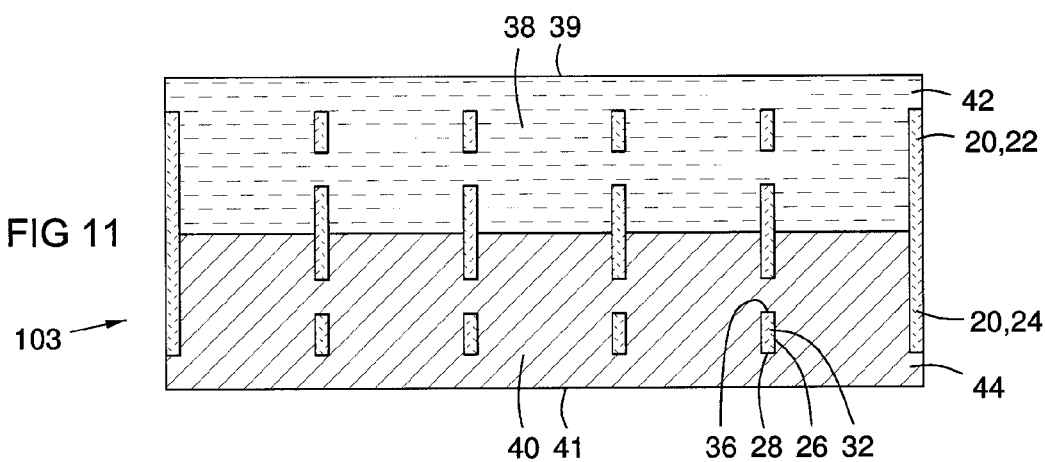

CMC ANCHOR FOR ATTACHING A CERAMIC THERMAL BARRIER TO METAL

FIELD OF THE INVENTION

The invention relates generally to mechanisms for attaching ceramic coatings to metal structures, and more particularly to attaching a ceramic thermal barrier coating to a metallic component by means of a mutually interlocked ceramic matrix composite (CMC) honeycomb.

BACKGROUND OF THE INVENTION

Metal structures in high temperature environments such as in gas turbines may be coated with a protective ceramic insulating layer called a thermal barrier coating (TBC). Various processes and thermal barrier compositions have been used, but usually have been limited to layers less than 2 mm thick due to thermal expansion differences between the coating and the metal. This limits the amount of protection provided by these coatings, and leads to high thermal gradients in the coating, which can cause spalling. Differential thermal expansion can crack the coating and weaken the bond with the protected substrate material.

Other approaches to adhering ceramic coatings to metal substrates include the use of metal foams or feltmetals. U.S. Pat. No. 5,605,046 (Liang) and others use fibrous metallic layers brazed to metal substrates and used as a compliant layer for ceramic TBCs. Improvements, such as U.S. Pat. No. 6,499,943 (Beeck, et al) focus on improving the temperature capability of the compliant metallic interlayer.

Other approaches include: graded composition coatings from metal-to-ceramic (e.g., U.S. Pat. No. 5,320,909) metal wire meshes bonded to the metallic substrate (e.g., U.S. Pat. No. 6,280,584 and U.S. Pat. No. 6,264,766); metallic protrusions integrally cast with the substrate (e.g., U.S. Pat. No. 6,720,087 & 6,251,526); metallic foam interlayers (U.S. Pat. No. 6,544,003); and metal honeycombs (U.S. Pat. No. 6,235,370).

The problem with all these solutions is the temperature limitation of the metallic interlayers. For porous or thin-walled metal structures, oxidation resistance is severely compromised by high surface area and rapid depletion of protective oxide forming elements. Thus, the compliant member becomes the temperature limiting feature of such designs. For applications where high heat flux and/or temperatures necessitate the use of ceramic thermal barrier coatings, improvements over these state-of-the-art solutions is desired.

Thus, there has been a long-standing need for thicker coatings with improved bonding and durability on metal structures for high temperature environments.

The present invention provides a high temperature, oxidation-resistant compliant layer between a structural metal substrate and an insulating ceramic coating. The compliant interlayer comprises a fiber-reinforced ceramic composite structure which is integrally tied to both metallic and ceramic coating members and is arranged in such a manner as to provide compliance for differential thermal expansion.

BRIEF DESCRIPTION OF THE DRAWINGS

The invention is explained in the following description in view of the drawings that show:

FIG. 3 is a perspective and sectional view of two cells with a second configuration of passages.

FIG. 4 is a perspective and sectional view of two cells with a third configuration of passages.

FIG. 8 is a flowchart of a method of making a metal structure with an attached thermal barrier such that of FIG. 7.

FIG. 9 shows an intermediate stage of forming certain embodiments by using a leachable, non-wetting, ceramic interface layer or core.

FIG. 10 shows an embodiment with an intermediate void after leaching the interface core.

FIG. 11 shows an embodiment without a separation sheet, layer, or void.

DETAILED DESCRIPTION OF THE INVENTION

Figure 1:
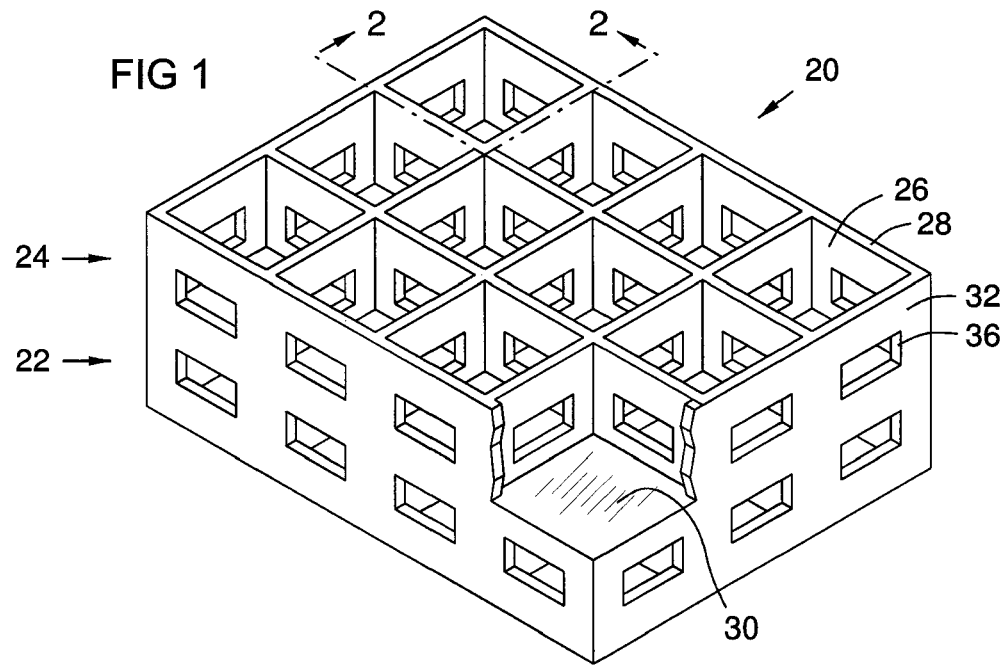
FIG. 1 is a perspective cut-away view of a CMC honeycomb according to aspects of the invention.

FIG. 1 illustrates a CMC honeycomb 20 with first 22 and second 24 arrays of cells 26 with open distal ends 28 on respective first and second sides of a CMC sheet 30. The CMC may have carbon or ceramic fibers 31 that may be continuous between the CMC sheet 30 and the cells 26, thereby providing a degree of tensile strength between the first 22 and second 24 array of cells. Such a continuous CMC honeycomb can be made using a 3-dimensional fabric weave followed by a ceramic matrix infusion as known in the art, or it can be achieved by mixing random fibers in a ceramic matrix, and molding the honeycomb. This structure is generally similar to the comb structure of honeybees, except the cells need not be hexagonal. They can be any tubular shape, including square as shown. The cells may have walls 32 with passages 36 that join or communicate between adjacent cells on the same side of the sheet.

Alternate methods of fabricating a CMC honeycomb include:

1. Stacking corrugated CMC sheets offset laterally to form channels, and bonding or curing the sheets together
2. Stacking and bonding a plurality of CMC braided tubes
3. Stacking and bonding a plurality of CMC 3D woven sheets of tubes.

Figure 2:
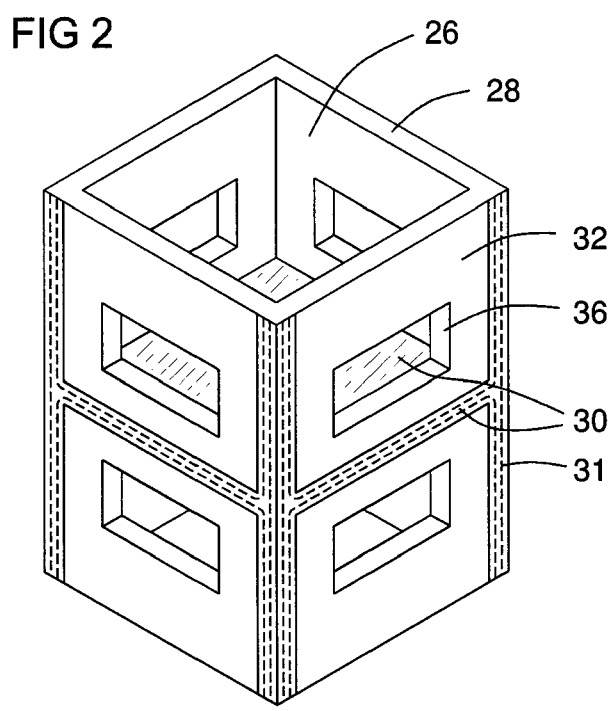
FIG. 2 is a perspective and sectional view of two cells of the CMC honeycomb on opposite sides of a CMC sheet per section line 2-2 of FIG. 1.

FIG. 2 shows two opposed interior cells 26 of the CMC honeycomb of FIG. 1 separated by a CMC sheet 30. Here "interior cell" means a cell that is surrounded by other cells. In FIGS. 1 and 2 each interior cell is connected by four passages 36 to four adjacent cells. FIG. 3 shows a configuration in which a cell of the second array has two levels of passages 36. The passages may be formed differently for the cells on opposed sides of the sheet 30 or they may be the same on both sides of the sheet. The depth of the cells from the sheet to the respective open distal end of the cells may be the same or different on opposed sides of the sheet. FIG. 4 shows a configuration in which a cell is connected by two passages 36 to two adjacent cells. These configurations and/or others may be used for interior and peripheral cells.

Figure 5:
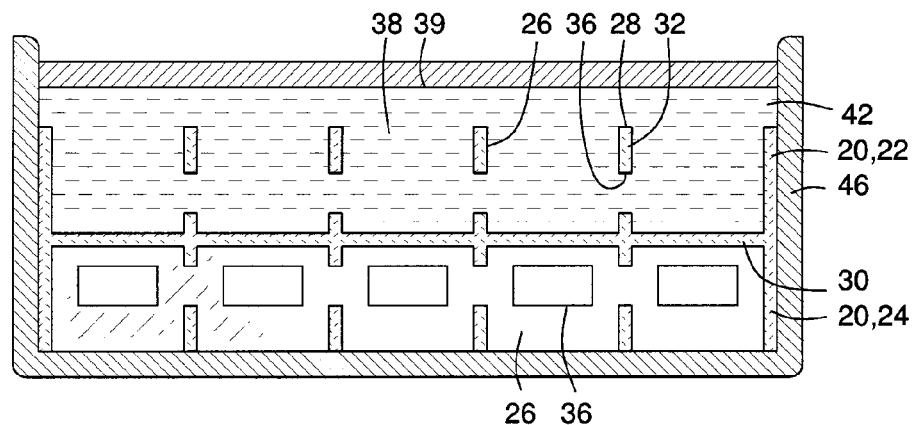
FIG. 5 is a sectional view of a stage of forming a structure according to the invention, in which ceramic insulation material is flowed into a first side of the CMC honeycomb using a mold. In this view the insulation side of the honeycomb is shown on top, since the coating material may be poured into the cells by gravity if desired.

FIG. 5 shows a ceramic insulation material 38 injected or poured into the cells and passages of the first array 22 using a mold 46, thus forming a continuous web of ceramic insulation that is locked into the CMC honeycomb 20. The first array 22 is shown on top in FIG. 5, in case a gravity pour is used for the ceramic 38. However, this vertical orientation is not necessary if injection molding is used. The mold 46 is shown schematically. While the CMC sheet 30 is illustrated as being planar, one skilled in the art will appreciate that other embodiments may include infusing the cells in a curved orientation, such as may be necessary when the end product being formed has a curved shape, such as for an airfoil, ring segment or combustor of a gas turbine engine, for example.

Figure 6:
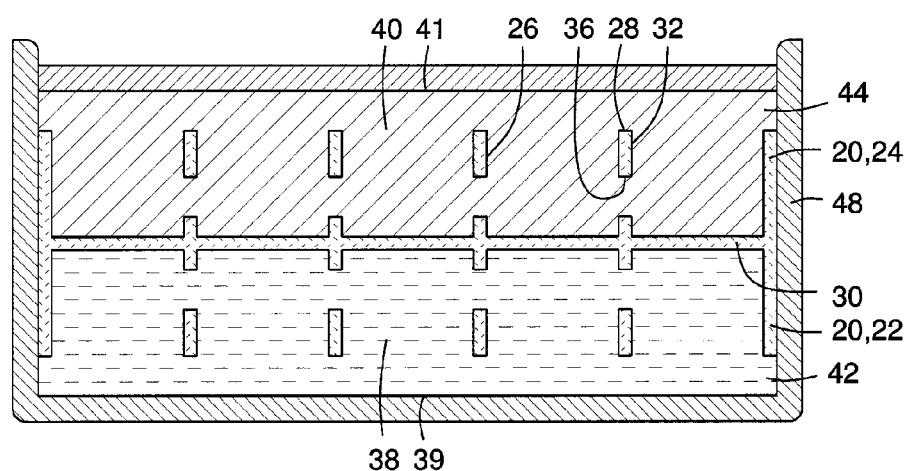
FIG. 6 is a sectional view of another forming stage, in which molten metal is flowed into a second side of the CMC honeycomb using a mold. Here the metal side of the structure is shown on top.

Once the ceramic material of the CMC honeycomb and ceramic composite structure of FIG. 5 has dried or cured sufficiently, it is ready to receive metal material as described with regard to FIG. 6. FIG. 6 shows a metal structure 40 formed by pouring or injecting a molten metal 40 into the cells and passages of the second array 24 (now on top) using a mold 48, thus forming a continuous web of metal that is locked into the honeycomb 20. The metal 40 and/or ceramic material 38 may overflow the cells 26 during the respective pouring operation as shown, forming a continuous metal wall 44 and/or a continuous ceramic insulation layer 42 covering respective sides of the honeycomb 20. The result is an insulated metal structure 101 as in FIG. 7, with an integrated CMC honeycomb 20 that locks the ceramic insulation 38 and the metal 40 together. The honeycomb structure includes ceramic fibers extending from the metal side of the structure to the ceramic side of the structure for providing an interconnection there between that is effective to enhance a bond between the metal layer 40 and the ceramic layer 38.

Surfaces 39, 41 with specific shapes may be formed on the ceramic insulation 38 and/or on the metal structure 40 in the molds 46, 48. For example, the ceramic insulation surface 39 may be formed as a surface of rotation, including a cylindrical surface. For example, shapes can be formed for gas turbine components such as ring seal segments, vane segment shrouds, transitions, and combustors. The ceramic 38 may be poured first. Then the ceramic 38 and CMC honeycomb 20 may be fired. Then the metal 40 may be poured. One or both surfaces 39, 41 may be later machined to final specifications.

Figure 7:
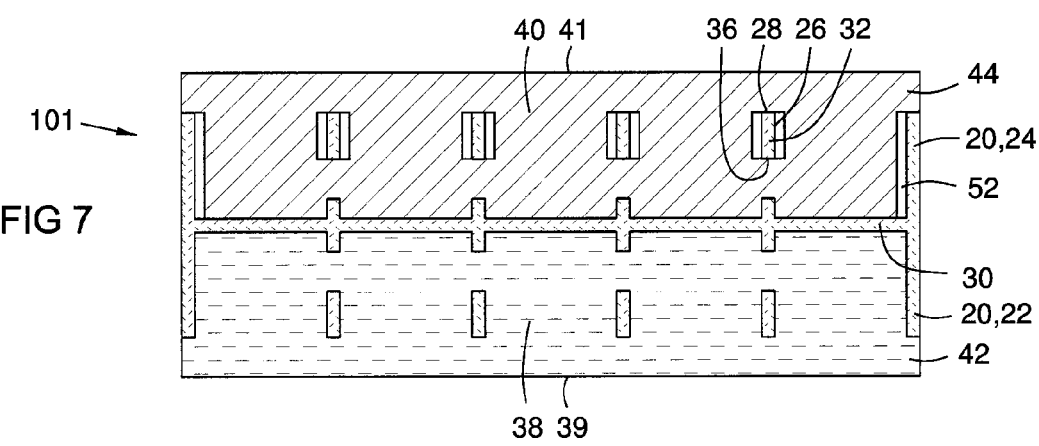
FIG. 7 is a sectional view of the insulated metal structure after cooling, showing clearances (exaggerated) between the metal and CMC created by metal shrinkage.

As shown in FIG. 7, the metal 40 may shrink more than the CMC during cooling of the metal pouring, which may separate the metal from some or all of the CMC surfaces. This process leaves clearances 52 that will later accommodate differential thermal expansion during use of the structure 101 in a variably high temperature environment. In prior art, differential thermal expansion and shrinkage during processing and usage can weaken the bond between the TBC and metal, and/or can crack the TBC. The present interlocking CMC honeycomb overcomes this problem without needing to match expansion characteristics of the TBC and metal, and without needing to manage and tolerate TBC cracking.

FIG. 8 illustrates a method 70 for making the structure 101 by forming 72 the CMC honeycomb 20, then partially or fully curing it 74, then placing 76 the honeycomb 20 into a mold 46, then pouring 78 ceramic insulation 38 into the cells 26 of the first array 22, then drying and at least partially curing 80 the ceramic 38 in the honeycomb, then placing 82 the honeycomb into a second mold 48, then pouring 84 metal into the cells 26 of the second array 22. The ceramic insulation material may include hollow ceramic spheres in a ceramic matrix as known in the art.

While oxide CMC's can survive most metal casting processes, the high temperatures required for Ni-based superalloys may degrade the CMC properties—particularly its strain tolerance. Even in this degraded state, the CMC still offers much better bond reinforcement and compliance than a straight metal-to-ceramic bond. However, methods that deposit metal at lower bulk temperatures may be used to minimize this effect on the CMC. Such methods may include:

1. Selective laser sintering (laser locally densifies thin layers of metal powder deposit—may not heat underlying material in bulk)
2. Physical vapor deposition
3. Active metal brazing (allows joining at a lower temperature than the metal melting temp. Can diffuse active species to increase thermal capacity of joint. Requires matching joint design with tolerance requirements.)
4. Powder metal approaches using sintering temperatures that are below melting point
5. The above can be used in combination with each other and/or casting. The term "deposit" may be used generically to describe any process for applying or forming the metal, ceramic, or other layers to form the structure described herein.

FIG. 9 illustrates an intermediate fabrication step that may be used in certain embodiments described below. A leachable, non-wetting ceramic core 53 may be deposited in a layer at the desired metal/ceramic coating interface prior to metal pouring and other steps as described below.

FIG. 10 illustrates an insulated metal structure 102 with a void 54 between an inner surface 45 of the metal substrate 40 and an inner surface 35 of the ceramic thermal barrier 38. This void 54 can be used for cooling or added compliance. It can be formed by the following steps:

1. Fill the CMC honeycomb 20 with a leachable, non-wetting ceramic core 53 in a layer at the desired metal/ceramic coating interface as in FIG. 9.
2. Cast or deposit metal 40 against one side of the core 53.
3. Cast or deposit ceramic 38 against the opposite side of the core 53.
4. Leach away the core 53, leaving a void 54.

FIG. 11 illustrates an embodiment 103 with no separation sheet or void between the metal 40 and ceramic 38.

1. Fill the CMC honeycomb 20 with a leachable, non-wetting ceramic core 53 in a layer at the desired metal/ceramic coating interface as in FIG. 9.
2. Cast or deposit metal 40 against one side of the core 53.
3. Leach away the core 53.
4. Cast or deposit ceramic 38 against the metal.

Figure 12:
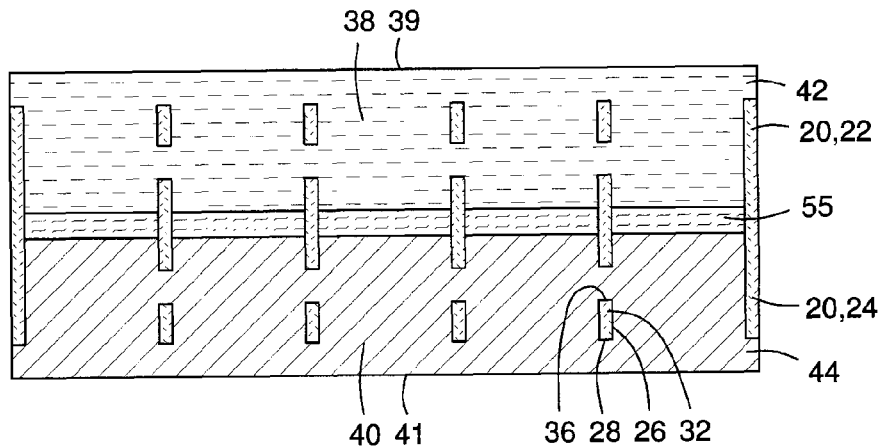
FIG. 12 shows an embodiment with a ceramic fiber intermediate layer.

FIG. 12 illustrates an embodiment 104 with a compliant ceramic buffer layer such as a fibrous ceramic felt or blanket 55 between the metal 40 and ceramic 38.

1. Fill the CMC honeycomb 20 with a leachable, non-wetting ceramic core 53 in a layer at the desired metal/ceramic coating interface as in FIG. 9.
2. Cast or deposit metal 40 against one side of the core 53.
3. Leach away the core 53.
4. Deposit ceramic fibers 55 against the metal inner surface.
5. Cast or deposit ceramic 38 against the ceramic fibers 55.

In another fabrication method, ceramic 38 can be deposited into the CMC anchor, and then cured, creating the ceramic layer 38 with an inner surface or interface plane. For embodiment 103 the metal 40 may then be deposited against the ceramic inner surface, allowing some infusion of the metal into the ceramic layer porosity. If infusion is not wanted, a non-wetting layer can be applied to the ceramic layer prior to applying the metal. For embodiments 102 and 104, a leachable, non-wetting ceramic core material 53 (embodiment 102) or ceramic fibers 55 (embodiment 104) can be deposited in a layer on the ceramic 38 inner surface as shown in FIG. 9 prior to metal deposition.

Figure 13:
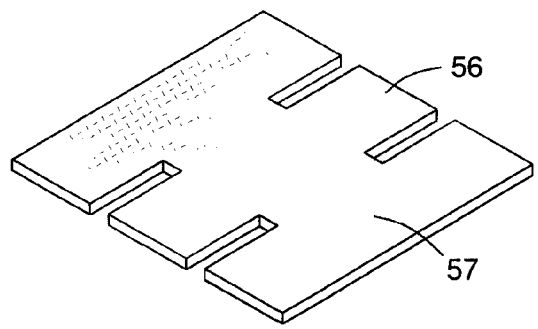
FIG. 13 shows a CMC sheet cut in a pattern for alternating tabs.
Figure 14:
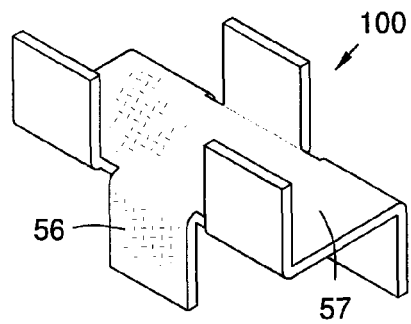
FIG. 14 shows a CMC anchor with alternating tabs for imbedding in the metal substrate and the ceramic thermal barrier layer.

Other CMC wall geometries besides honeycombs may be used. The term "anchor" may be used to describe any CMC wall structure that joins a metal substrate 40 and a ceramic barrier layer 38 as described and claimed herein. For example, FIGS. 13 and 14 illustrate a fabrication technique for a CMC anchor 100 in which a flat pattern with cutouts is formed in a CMC sheet 57 to create tabs 56, which are folded up and down in a desired pattern (e.g., alternating). This creates alternating tabs 56 connected to a face sheet 57. The tabs may then be embedded in a metal substrate and a ceramic coating on opposite sides of the face sheet 57. The tabs 56 may have transverse passages for interlocking with the ceramic 38 and metal 40 (not shown in these two figures).

Figure 15:
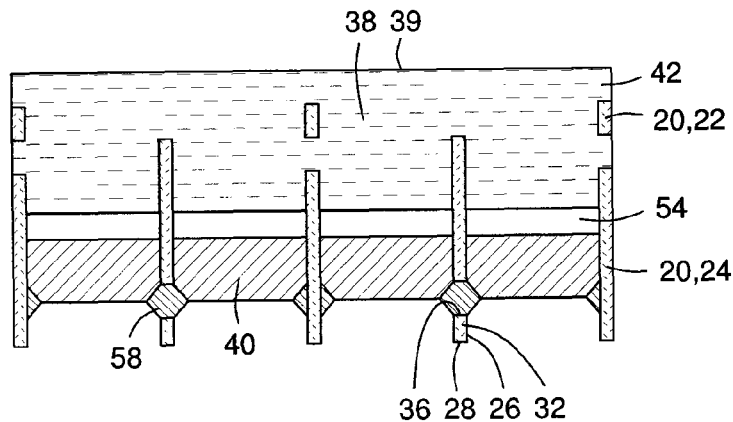
FIG. 15 shows an embodiment with walls of a CMC anchor passing through the metal substrate, and attached to the back-side of the metal substrate.

FIG. 15 illustrates an embodiment 105 in which CMC anchor walls 32 protrude through the metal substrate 40, and are attached to the backside of the metal. This allows a lower-temperature joining process, such as brazing 58 or even mechanical attachment in a manner that creates an interlock between the metal 40 and passages 36 in the CMC anchor.

While various embodiments of the present invention have been shown and described herein, it will be obvious that such embodiments are provided by way of example only. Numerous variations, changes and substitutions may be made without departing from the invention herein. For example, the honeycomb structure may be a fully infused CMC material, or it may be only partially infused with matrix material so that it is somewhat porous, thereby allowing the infusion of the respective ceramic 38 or metal 40 layers to further strengthen those layers. Alternatively, the sheet 30 may be infused to a different degree than the walls 32 of the honeycomb, such as to allow more interconnection between the cells on respective sides of the sheet but still maintaining a CMC boundary between the ceramic 38 and metal 40 layers. In another embodiment it may be desired to omit the sheet 30 and to form the ceramic 38 to only partially fill the honeycombs, then to complete the fill of the honeycombs with the metal 40. This embodiment maintains the integrity of continuous ceramic fibers extending across the boundary between the metal and its protective ceramic insulating layer, thereby improving the bonding there between.

The invention claimed is:

1. An apparatus comprising:
   a metal substrate;
   a ceramic thermal barrier;
   a ceramic matrix composite (CMC) anchor between the metal substrate and the ceramic thermal barrier, wherein the CMC anchor extends into and interlocks with the ceramic thermal barrier, and extends into and interlocks with the metal substrate.

2. The apparatus of claim 1 wherein the CMC anchor comprises first and second arrays of cells with open distal ends on respective first and second sides of a CMC separation sheet, wherein transverse passages are formed in walls between at least some of the cells of the first array.

3. The apparatus of claim 2, wherein the ceramic thermal barrier is deposited into the cells and through the passages of the first array, thus interlocking the ceramic thermal barrier with the cells of the first array.

4. The apparatus of claim 3, wherein the ceramic thermal barrier extends beyond the cells of the first array forming a ceramic wall across the distal ends of the cells of the first array.

5. The apparatus of claim 3, further comprising passages formed in walls between at least some of the cells of the second array, and wherein the metal substrate is deposited into the cells and passages of the second array, thus interlocking the metal substrate with the cells of the second array.

6. The apparatus of claim 5, wherein the metal structure extends beyond the cells of the second array forming a metal wall across the distal ends of the cells of the second array.

7. The apparatus of claim 6, wherein clearance is formed between the metal substrate and the walls of the cells of the second array.

8. The apparatus of claim 1, wherein the metal substrate is attached to the CMC anchor by depositing molten metal for the metal substrate into the CMC anchor and through passages in walls of the CMC matrix.

9. The apparatus of claim 1, wherein the CMC anchor comprises portions extending into the metal substrate, and said portions comprise passages that interlock the CMC anchor with the metal substrate without metallurgical bonding.

10. The apparatus of claim 1, wherein the ceramic thermal barrier and the metal substrate are separated from each other within the CMC anchor by a void.

11. The apparatus of claim 1, wherein the ceramic thermal barrier and the metal substrate are separated from each other within the CMC anchor by a compliant ceramic buffer.

12. The apparatus of claim 11, wherein the compliant buffer comprises ceramic fiber felt.

13. The apparatus of claim 1, wherein the ceramic thermal barrier and the metal substrate contact each other within the CMC anchor along a diffusion zone in which the metal substrate is partially diffused into the ceramic thermal barrier.

14. The apparatus of claim 1, wherein the CMC anchor comprises portions extending through the metal substrate and attached to a back side of the metal substrate.

15. The apparatus of claim 14, wherein the extending portions are attached to the back side of the metal substrate by brazing across transverse passages in the extending portions.

16. The apparatus of claim 14, wherein the extending portions are attached to the back side of the metal substrate by mechanical attachment across transverse passages in the extending portions.

17. An apparatus comprising:
   a ceramic matrix composite (CMC) honeycomb comprising cell walls extending in a first direction into a metal substrate and cell walls extending in an opposite direction into a ceramic thermal barrier;
   at least one transverse passage formed in at least one of the cell walls extending into the metal substrate, interlocking the metal substrate with the honeycomb; and
   at least one transverse passage formed in at least one of the cell walls extending into the ceramic thermal barrier, interlocking the ceramic thermal barrier with the honeycomb.

18. The apparatus of claim 17, further comprising a CMC separation sheet between the cell walls extending in the first direction and the cell walls extending in the opposite direction.

19. The apparatus of claim 18, wherein the metal substrate fills cells of the honeycomb on a first side of the separation sheet, and the ceramic thermal barrier fills cells of the honeycomb on a second side of the separation sheet.

* * * * *